(12) United States Patent
Watanabe et al.

(10) Patent No.: US 8,315,668 B2
(45) Date of Patent: Nov. 20, 2012

(54) MOBILE COMMUNICATION SYSTEM AND ACCESS GATEWAY HAVING PLURAL USER PLANE AGWS

(75) Inventors: Koji Watanabe, Kawasaki (JP); Yosuke Takahashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 711 days.

(21) Appl. No.: 12/416,183

(22) Filed: Apr. 1, 2009

(65) Prior Publication Data

US 2009/0252133 A1    Oct. 8, 2009

(30) Foreign Application Priority Data

Apr. 7, 2008    (JP) ................... 2008-099326

(51) Int. Cl.
*H04B 1/38* (2006.01)

(52) U.S. Cl. ...... 455/560; 455/41.1; 455/41.2; 455/509; 370/338

(58) Field of Classification Search ............... 370/331, 370/332, 338, 401; 455/560, 41.1–41.2, 455/509
See application file for complete search history.

(56) References Cited

U.S. PATENT DOCUMENTS

| | | | |
|---|---|---|---|
| 2004/0240389 A1* | 12/2004 | Bessis et al. | 370/252 |
| 2005/0058068 A1* | 3/2005 | Ben Ali et al. | 370/230 |
| 2005/0122942 A1* | 6/2005 | Rhee et al. | 370/338 |
| 2007/0118670 A1* | 5/2007 | Viswanath et al. | 709/249 |
| 2009/0111458 A1* | 4/2009 | Fox et al. | 455/422.1 |

OTHER PUBLICATIONS

IETF RFC3344, IP Mobility Support for IPv4, http://www.ietf.org/rfc/rfc3344.txt, Feb. 23, 2009.
3GPP2 (3rd Generation Partnership Project 2), Basic IP Service for Converged Access Network Specification, Dec. 19, 2007.

* cited by examiner

*Primary Examiner* — Jinsong Hu
*Assistant Examiner* — Michael Nguyen
(74) *Attorney, Agent, or Firm* — Mattingly & Malur, PC

(57) ABSTRACT

In a mobile communication system including an access gateway (AGW) comprising a C-AGW for handling control messages and a plurality of U-AGWs for forwarding data packets, the C-AGW is provided with a management table indicating an address of U-AGW to be an endpoint of tunnel, in association with each of mobile station IDs. When a tunnel setup request message including a mobile station ID is received from one of base stations, the C-AGW searches the management table for the address of U-AGW corresponding to the mobile station ID and notifies the base station of the U-AGW address, and if the mobile station ID is not found in the management table, the C-AGW notifies the base station of an address of a particular U-AGW selected out of the U-AGWs, so that the base station establishes a tunnel for forwarding data packets toward the notified U-AGW.

16 Claims, 16 Drawing Sheets

QoS INFORMATION TABLE 58

FIG. 10A

| ATID | USER QoS PROFILE ||
| --- | --- | --- |
| | PRIORITY (582A) | MAXIMUM BANDWIDTH (582B) |
| AT20A | 1 | xxxx |
| AT20B | 2 | xxxx |
| ⋮ | ⋮ | ⋮ |

FIG. 10B

| ATID | USER QoS PROFILE |||
| --- | --- | --- | --- |
| | PRIORITY (582A) | MAXIMUM BANDWIDTH (582B) | ALLOWED SERVICE CLASS (582C) |
| AT20A | 1 | xxxx | xxx |
| AT20B | 2 | xxxx | xxx |
| ⋮ | ⋮ | ⋮ | ⋮ |

FIG. 11

U-AGW ADDRESS TABLE 59

| ATID | U-AGW ADDRESS | BS ADDRESS | BINDING TYPE | |
|---|---|---|---|---|
| AT20A | IP6-1 | IP10A | Primary | ~EN1 |
| AT20B | IP6-2 | IP10B | Primary | ~EN2 |
| ⋮ | ⋮ | ⋮ | ⋮ | |

FIG. 12A

U-AGW ADDRESS TABLE 59

| ATID | U-AGW ADDRESS | BS ADDRESS | BINDING TYPE | |
|---|---|---|---|---|
| AT20A | IP6-1 | IP10A | Primary | ~EN1 |
| AT20B | IP6-2 | IP10B | Primary | ~EN2 |
| ⋮ | ⋮ | ⋮ | ⋮ | |
| AT20A | IP6-1 | IP10B | RL Only | ~EN11 |
| ⋮ | ⋮ | ⋮ | ⋮ | |

| ATID | U-AGW ADDRESS | BS ADDRESS | BINDING TYPE | |
|---|---|---|---|---|
| AT20A | IP6-1 | IP10B | Primary | ~EN1 |
| AT20B | IP6-2 | IP10B | Primary | ~EN2 |
| ⋮ | ⋮ | ⋮ | ⋮ | |

591, 592, 593, 594

U-AGW STATUS TABLE 300

| U-AGW ADDRESS (301) | AMOUNT OF CONSUMED RESOURCES (302) |
|---|---|
| IP6-1 | |
| IP6-2 | |
| ⋮ | |
| IP6-m | |

MOBILE COMMUNICATION SYSTEM AND ACCESS GATEWAY HAVING PLURAL USER PLANE AGWS

CLAIM OF PRIORITY

The present patent application claims priority from Japanese patent application JP 2008-099326, filed on Apr. 7, 2008, the content of which is hereby incorporated by reference into this application.

BACKGROUND OF THE INVENTION (1) Field of the Invention

The present invention relates to a mobile communication system and, more particularly, to a mobile communication system including an Access Gateway (AGW) located between an access network accommodating a plurality of base stations and a core network.

(2) Description of Related Art

In a wireless access network, a tunnel is established between a Base Station (BS) and an Access Gateway (AGW) and user data is transmitted through the tunnel, using a mobile IP (Mobile Internet Protocol) of the IETF (Internet Engineering Task Force). The tunnel of mobile IP is established by exchanging, for example, a Registration Request (RRQ) message and a Registration Reply (RRP) message of Proxy Mobile IP (PMIP) between the BS and the AGW. The formats of RRQ message and RRP message of PMIP are disclosed in IETF RFC3344, sections 3.1 and 3.2.

Meanwhile, in a wireless access network such as UMB (Ultra Mobile Broadband)/CAN (Converged Access Network) of 3GPP2 (3rd Generation Partnership Project 2), separation between a control plane handling control messages and a user plane handling user data is pursued. For example, 3GPP2 X. S0054-100-0 v1.0, sections 4.4 and 4.6, disclose that a data path and a signaling path are separated at an AGW.

FIG. 3 shows an example of a conventional wireless access network.

A Home Agent (HA) 2 of mobile IP and an Authentication Authorization and Accounting (AAA) server 3 for performing user authentication, access authorization, and accounting are connected to a core network 1. Base Stations (BSs) 10 (10A, 10B, ... 10N) are connected to the core network 1 via an access gateway AGW 4. Reference numeral 7 denotes a session control apparatus (SRNC: Session Reference Network Controller) and reference numerals 20 (20A, 20B, ...) denote mobile stations.

The AGW 4 includes an AGW unit 5 for control use which handles control messages (control packets) and an AGW unit 6 for user data forwarding which handles user data (user packets). In the following description, the AGW unit 5 for control use is referred to as a C-AGW (Control plane AGW) and the AGW unit 6 for user data forwarding as a U-AGW (User plane AGW). In the above wireless access network, control packets are forwarded via the C-AGW 5 as indicated by dotted lines, and user packets are forwarded via the U-AGW 6 as indicated by solid lines.

FIG. 4 shows a signaling sequence to be performed, for example, for establishing a tunnel for forwarding user data between a BS 10A and the AGW 4 when an AT 20A is connected to the core network 1 in the wireless access network shown in FIG. 3.

When a connection request is issued from the AT 20A, an access authentication procedure is executed between the AAA server 3 and the AT 20A via the BS 10A, SRNC 7, and C-AGW 5 (SQ10a, SQ10b, SQ10c). At this time, the BS 10A is notified from the C-AGW 5 of an IP address of C-AGW 5 as AGW-ID (SQ11) and the C-AGW 5 is notified from the AT 20A of an identifier of AT 20A (ATID) to be authenticated (SQ12).

Upon completion of access authentication of the AT 20A, the BS 10A performs configurations (SQ14a, SQ14b) to establish a wireless connection between the AT 20A and the BS 10A. After that, the BS 10A transmits to the C-AGW 5 a tunnel setup request message to establish a tunnel for forwarding user data. The tunnel setup request includes the identifier (ATID) of AT 20A. In this case, a PMIP RRQ message is transmitted as the tunnel setup request (SQ15). In the case of a system framework that allows the AGW 4 to establish a plurality of tunnels for the same AT, the BS 10A adds control information ("Primary") for indicating the first tunnel setup to the PMIP RRQ message.

Upon receiving the PMIP RRQ message, the C-AGW 5 returns a reply message, which is a PMIP RRP message in this example, to the BS 10A (SQ16). The PMIP RRP message includes an IP address of U-AGW 6 as information ("Endpoint") for indicating a termination point of the tunnel. Upon receiving the PMIP RRP message from the C-AGW 5, the BS 10A establishes a tunnel toward the U-AGW 6 specified by the "Endpoint" (SQ18). Thereby, the AT 20A transits into a state capable of communicating user data with a correspondent node connected to the core network 1 through the tunnel established between the BS 10A and the U-AGW 6 (SQ19a, SQ19b, SQ19c).

SUMMARY OF THE INVENTION

In the case where the AGW 4 includes a single U-AGW 6, as in the wireless access network shown in FIG. 3, the C-AGW 5 can return a reply message designating the same U-AGW as the Endpoint, in response to every tunnel setup request received from the base stations.

However, in the case where the AGW 4 comprises a C-AGW and a plurality of U-AGWs, when a tunnel setup request is received from one of base stations, the C-AGW 5 has to assign an optimum U-AGW to an AT by taking the load conditions of the U-AGWs into account. 3GPP2 X. S0054-100-0 v1.0 does not disclose about a method of assigning a U-AGW to an AT by the AGW 4 provided with a plurality of U-AGWs.

In a broadband mobile communication system such as UMB (Ultra Mobile Broadband), an elaborate handover control adaptable to mobile ATs is required in order to achieve high-speed data transmission with high efficiency. In the UMB communication system, BS switching control is performed so as to connect an AT to one of BSs for which both the statuses of uplink channel and downlink channel are the best, for example, by monitoring the status of uplink radio channel from the AT to each BS and the status of downlink radio channel from the BS to the AT, by the AT 20 and BSs 10. In this case, there is a possibility that handovers of the same AT occur frequently between BSs for a short period depending on the situation of radio channels, with the result that ineffectual control procedures are executed repeatedly. If the conditions for handover execution occur frequently, it becomes difficult for BSs and AGW to follow up these handovers because a certain time is required for the tunnel setup between BS and AGW.

An object of the present invention is to provide a mobile communication system and an access gateway (AGW) enabling assignment of an optimum U-AGW selected from among a plurality of U-AGWs when a tunnel setup request occurs from a base station.

Another object of the present invention is to provide a mobile communication system and an access gateway (AGW) capable of assigning a U-AGW to a base station so as to distribute loads to a plurality of U-AGWs when a tunnel setup request occurs from the base station.

To achieve the above objects, one aspect of the present invention resides in a mobile communication system comprising a plurality of base stations for wireless communicating with mobile stations and an access gateway (AGW) connected to a core network, wherein tunnels for forwarding data packets are established between each of the base stations and the AGW. The AGW comprises an access gateway unit (C-AGW) for communicating control messages with each of the plurality of base stations via an access network and a plurality of access gateway units (U-AGWs) each of which communicates data packets with the plurality of base stations via the access network.

The C-AGW comprises a first management table including a plurality of table entries, each storing an address of base station to be a first endpoint of a tunnel and an address of one of said U-AGWs to be a second endpoint of the tunnel, in association with a mobile station identifier, and a controller that returns a reply message to one of the base stations when a tunnel setup request message including a mobile station identifier is received from the base station, the reply message indicating an address of U-AGW to be the second endpoint of the tunnel. The controller searches the first management table for an objective table entry corresponding to the mobile station identifier specified in the tunnel setup request message, notifies the base station of the address of U-AGW indicated in the objective table entry by the reply message when the objective table entry is found in the first management table, and if the objective table entry is not yet registered in the first management table, notifies the base station of an address of a particular U-AGW selected out of said plurality of U-AGWs by the reply message.

More specifically, if said objective table entry is not yet registered in the first management table, the controller of the C-AGW registers to the first management table a new table entry indicating the address of the base station having transmitted the tunnel setup request message and the address of said particular U-AGW, in association with the mobile station identifier specified in the tunnel setup request message.

In the case where the tunnel setup request message was transmitted from a base station to which the mobile station having the mobile station identifier should be handed over, for example, the controller of the C-AGW rewrites the base station address in the objective table entry registered in the first management table to the address of the base station having transmitted the tunnel setup request message.

In the case where the tunnel setup request message requests to establish a second tunnel to be coexistent with a first tunnel being used by the mobile station having the mobile station identifier, for example, the controller of the C-AGW registers to the first management table a new table entry indicating the address of the base station having transmitted the tunnel setup request message and the address of said particular U-AGW, in association with the mobile identifier specified in the tunnel setup request message.

One feature of the present invention resides in that the C-AGW further comprises a U-AGW status table for indicating an amount of consumed communication resources for each of U-AGWs, and when the objective table entry is not yet registered in the first management table, the controller of the C-AGW selects one of U-AGWs having the smallest amount of consumed communication resources from the U-AGW status table and notifies the base station of the address of the U-AGW by the reply message.

According to an embodiment of the present invention, the C-AGW further comprises a second management table including a plurality of table entries, each of which stores in association with the identifier of the mobile station, communication quality information indicating communication quality to be ensured to the mobile station. When the objective table entry is not yet registered in the first management table, the controller of the C-AGW searches the second management table for communication quality information corresponding to the mobile station identifier specified in the tunnel setup request message and selects a particular U-AGW that satisfies the communication quality information out of the plurality of U-AGWs.

According to another embodiment of the present invention, at least one of the plurality of U-AGWs is dedicated to a specific communication service, and the communication quality information stored in the second management table includes communication service class. In this embodiment, when the objective table entry is not yet registered in the first management table, the controller of the C-AGW searches the second management table for a table entry corresponding to the mobile station identifier specified in the tunnel setup request message and selects the particular U-AGW dedicated to the specific communication service when the table entry includes the communication service class corresponding to the specific communication service.

The communication quality information stored in the second management table may include, for example, service priority. In this case, when the objective table entry is not yet registered in the first management table, the controller of the C-AGW counts the number of tunnels having the highest service priority for each of U-AGWs based on the first management table and the second management table, and selects a U-AGW having the smallest number of tunnels.

The communication quality information stored in the second management table may include, for example, a bandwidth value. In this case, when the objective table entry is not yet registered in the first management table, the controller of the C-AGW calculates a total amount of bandwidth ensured for tunnels having been established for each of U-AGWs based on the first management table and the second management table, and selects a U-AGW having the smallest total amount of bandwidth.

According to the present invention, when a mobile station has moved from a service area (cell) of a first base station into a service area of a second base station and a tunnel setup request was issued from the second base station, the C-AGW can assign the same U-AGW as the endpoint of an existing tunnel having been established by the first base station to the second base station. Therefore, even if a base station to be connected to the mobile station through a radio channel has switched from the first base station to the second base station, data packets communicated by the moved mobile station can be continuously forwarded through the same U-AGW.

Further, according to the present invention, when a tunnel setup request to establish a first tunnel for the mobile station is received from one of the base stations, the C-AGW can select a U-AGW to be assigned to the mobile station so as to distribute loads to a plurality of U-AGWs in the AGW. Therefore, it is possible to prevent a remarkable delay in packets forwarding from occurring in a particular U-AGW due to unbalanced loads. In addition, it is possible to forward data packets while ensuring communication quality for each mobile station, in the case where the C-AGW selects a U-AGW suitable for the mobile station by referring to the communication quality required by the mobile station.

BRIEF DESCRIPTION OF THE DRAWINGS

FIGS. 10A and 10B illustrate embodiments of a QoS information table 58 formed in the memory 53 of the C-AGW 5;

FIG. 11 illustrates an embodiment of a U-AGW address table 59 formed in the memory 53 of C-AGW 5;

FIGS. 12A and 12B illustrate transition of contents of the U-AGW address table 59;

DETAILED DESCRIPTION OF PREFERRED EMBODIMENTS

Preferred embodiments of the present invention will be described hereinafter with reference to the drawings.

Figure 1:
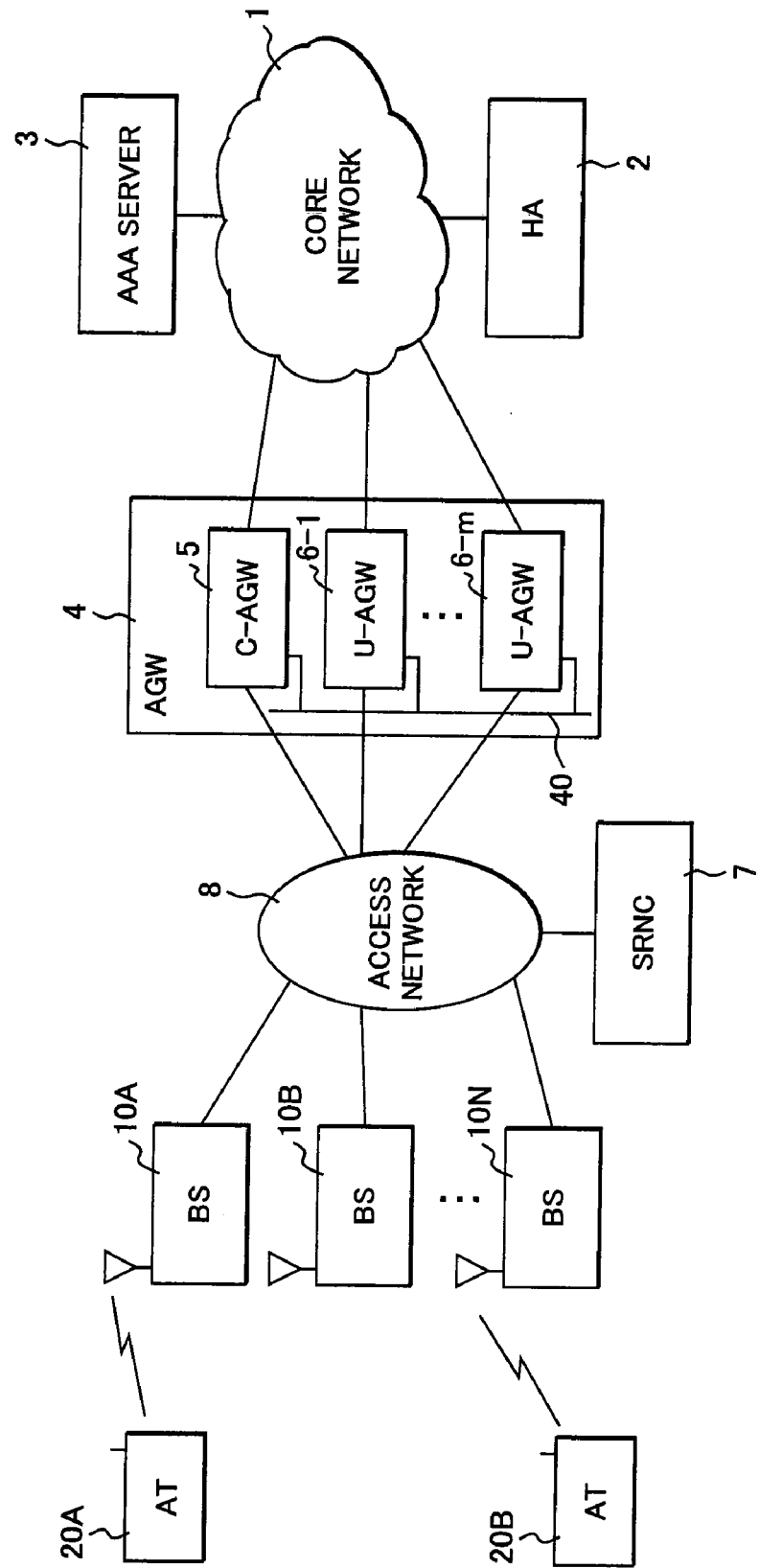
FIG. 1 is a diagram showing an example of a mobile communication system to which the present invention is applied.

FIG. 1 shows an example of a mobile communication system to which the present invention is applied.

In the mobile communication system shown here, an AGW 4 equipped with a plurality of U-AGWs 6 (6-1 to 6-m) is located between an access network 8 and a core network 1. The access network 8 accommodates a session control apparatus SRNC (Session Reference Network Controller) 7 and a plurality of base stations 10 (10A, 10B, ... 10N) and the core network 1 includes a Home Agent (HA) 2 and an AAA server 3. In the AGW 4, the plurality of U-AGWs 6 (6-1 to 6-m) are connected to a C-AGW 5 by an AGW internal bus 40.

Figure 2:
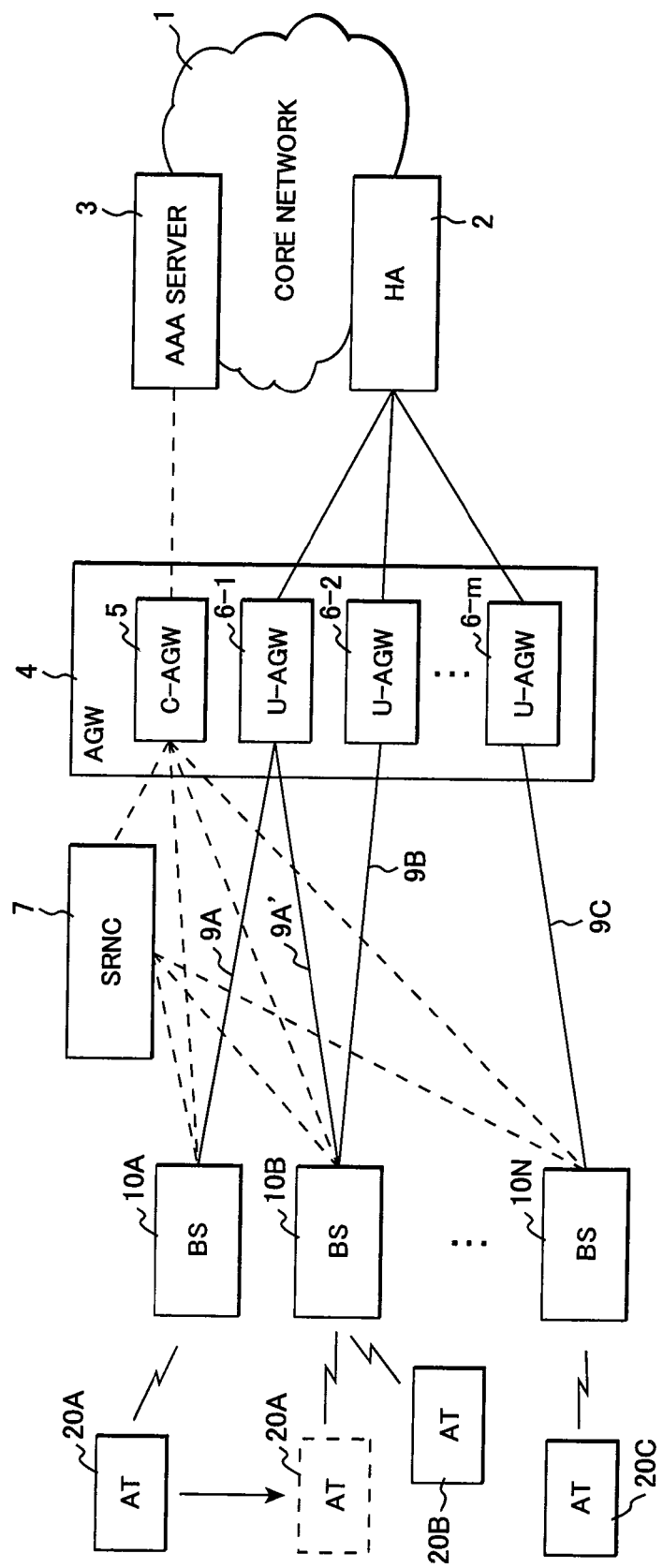
FIG. 2 is a diagram showing logical connection relationships among BSs 10, SRNC 7, AGW 4, HA 2, and AAA server 3 shown in FIG. 1.
Figure 3:
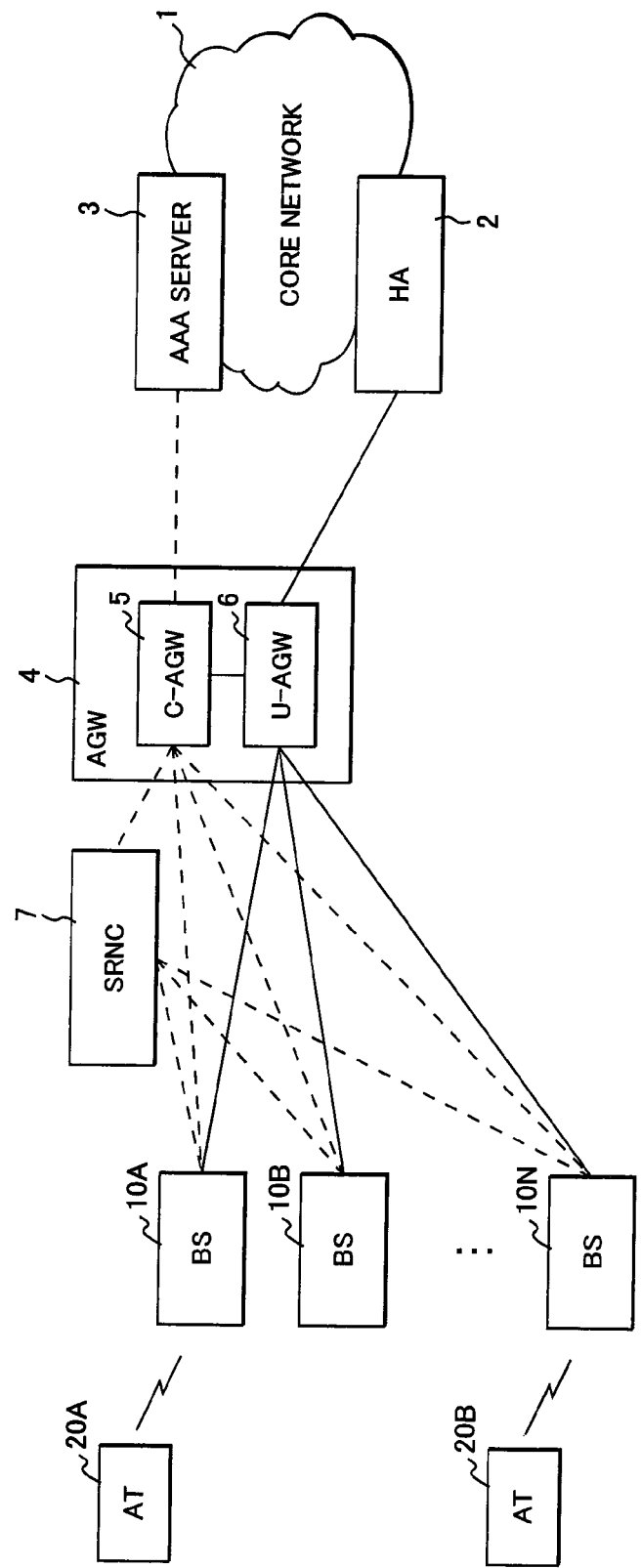
FIG. 3 is a diagram showing an example of a conventional wireless access network.

FIG. 2 shows logical connection relationships among BSs 10, SRNC 7, AGW 4, HA 2, and AAA server 3 shown in FIG. 1. In the mobile communication system of the present invention, control messages (control packets) are handled by the C-AGW 5 as indicated by dotted lines, whereas user data (user packets) are distributed to the plurality of U-AGWs 6-1 to 6-m as indicated by solid lines.

The C-AGW 5 is provided with a management table for storing, in association with the identifier of each mobile station (AT) having been successfully authenticated its access right, information (user QoS profile) representing, for example, communication quality required by the AT and addresses of a base station (BS) and a U-AGW to be the endpoints of a tunnel established for the AT, as will be described later. Upon receiving a tunnel setup request message including an AT identifier from one of BSs 10, the C-AGW searches the management table for a table entry including the AT identifier. If the table entry corresponding to the AT identifier is not registered in the management table, the C-AGW 5 determines the load status of each U-AGW by referring to the management table, selects one of U-AGWs to be the endpoint of the tunnel in such a manner that the loads of U-AGWs 6-1 to 6-m are distributed, and notifies the address of the selected U-AGW to the BS having transmitted the tunnel setup request.

In FIG. 2, user packets to be communicated by an AT 20A are forwarded through a tunnel 9A established between the BS 10A and the U-AGW 6-1, user packets to be communicated by an AT 20B are forwarded through a tunnel 9B established between the BS 10B and the U-AGW 6-2, and user packets to be communicated by an AT 20C are forwarded through a tunnel 9C established between the BS 10N and the U-AGW 6-m.

Now, assume that the AT 20A has moved into a coverage area of BS 10B from a coverage area of BS 10A, as indicated by an arrow, in a state where a table entry for the AT 20A has been already registered in the management table at the time of establishing the tunnel 9A. In this case, when a tunnel setup request for the AT 20A is received from the BS 10B, the C-AGW 5 can retrieve the address of the U-AGW 6-1 stored in associated with the identifier of the AT 20A from the management table, and notify the BS 10B of the address of the U-AGW 6-1 as the tunnel endpoint address. Thereby, a new tunnel 9A' for the AT 20A is established between the BS 10B and the U-AGW 6-1. According to the present invention, as the existing tunnel 9A and the new tunnel 9A' are terminated by the same U-AGW 6-1, forwarding of packets to be communicated by the AT 20A can be controlled continuously by the same U-AGW 6-1, even if the BS serving the AT has changed.

Figure 5:
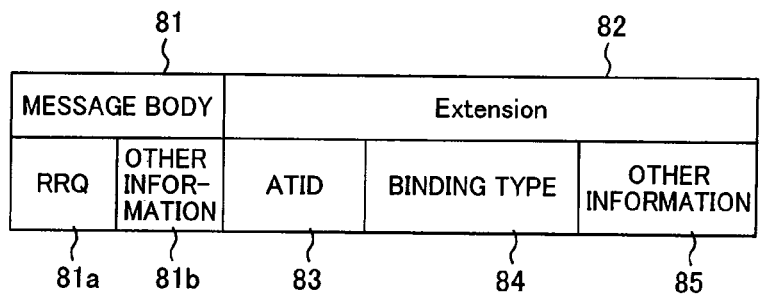
FIG. 5 is a diagram illustrating an example of format of a tunnel setup request message transmitted from a BS 10 to a C-AGW 5.

FIG. 5 shows the format of a Registration Request (RRQ) message 80 of Proxy Mobile IP (PMIP) as an example of a tunnel setup request message to be transmitted from each base station (BS) 10 to the C-AGW 5.

The RRQ message 80 comprises a message body 81 and an extension part 82. The message body 81 is a main part other than the extension part of a Registration Request message described in IETF RFC3344, section 3.3, and comprises a message type 81a indicating that this message is RRQ and other information 81b including IP addresses, etc. The extension part 82 includes a mobile station identifier (ATID) 83, a binding type 84 indicative of the type of tunnel, and other information 85.

The binding type 84 includes discrimination information for indicating whether the tunnel requested to be set up by the RRQ message 80 is the first tunnel ("Primary") for the mobile station identified by the ATID 83 or the second or subsequent tunnel ("Reverse Link (RL) Only") to be set up for upward data transmission. The other information 85 includes information such as, e.g., a service class required by the AT.

Figure 6:
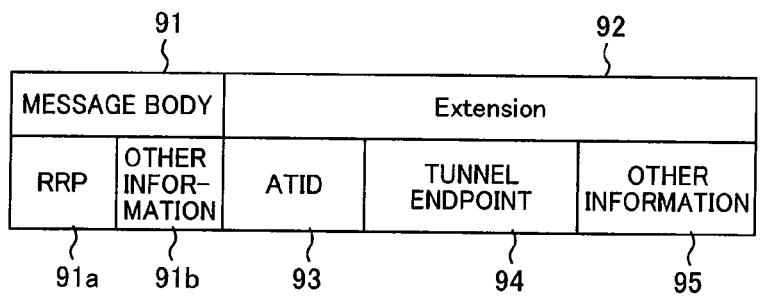
FIG. 6 is a diagram illustrating an example of format of a reply message returned from the C-AGW 5 to the BS 10.

FIG. 6 shows the format of a PMIP RRP message 90 to be returned by the C-AGW 5 to the BS 10 as a reply message in response to the RRQ message 80.

The RRP message comprises a message body 91 and an extension part 92. The message body 91 is a main part other than the extension part of a Registration Reply message described in IETF RFC3344, section 3.4, and comprises a message type 91a indicating that this message is RRP and other information 91b including IP addresses, etc. The extension part 92 includes the mobile station identifier (ATID) 93, a tunnel endpoint 94, and other information 95. In the field of tunnel endpoint 94, the IP address of U-AGW having been selected from among the U-AGWs 6-1 to 6-m by the C-AGW 5 is set.

Figure 7:
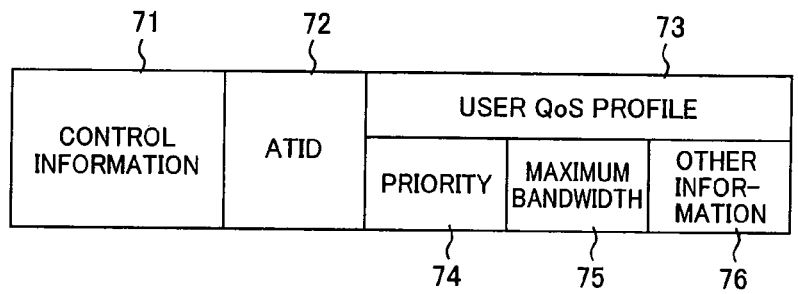
FIG. 7 is a format of a User QoS Profile message 70 transmitted from the AAA-server 3 to the C-AGW 5.

FIG. 7 shows the format of a User QoS Profile message 70 to be transmitted from the AAA-server 3 to the C-AGW 5.

The User QoS Profile message comprises a control information part 71, a mobile station identifier (ATID) 72, and a user QoS profile 73 representing a communication service quality (QoS) ensured to the AT identified by the ATID. The control information part 71 includes a message type indicating that this message 70 is a user QoS profile message and other information. The user QoS profile 73 includes, for example, priority 74 of communication service, a maximum bandwidth (BW) 75 available for the AT, and other information 76.

Figure 8:
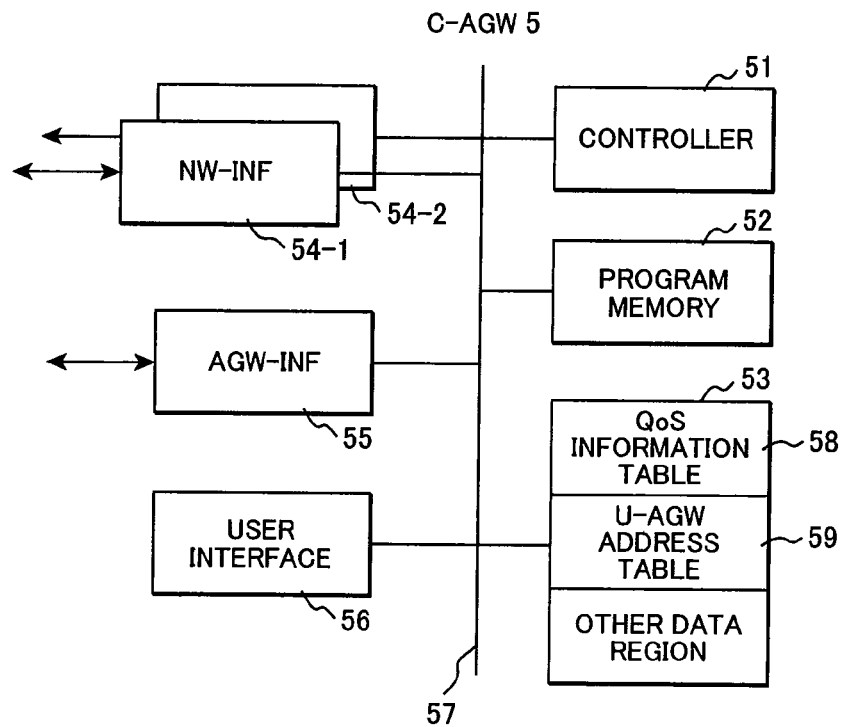
FIG. 8 is a block structural diagram showing an embodiment of the C-AGW 5.

FIG. 8 is a block structural diagram sowing an embodiment of the C-AGW 5.

The C-AGW 5 comprises a controller (processor) 51, a program memory 52 for storing protocol processing routines and other control programs to be executed by the controller 51, a data memory 53, a network interface (NW-INF) 54-1 for connecting to the core network 1, a network interface (NW-INF) 54-2 for connecting to the access network 8, an AGW interface (AGW-INF) 55 for connecting to the AGW internal bus 40, a user interface 56, and an internal bus 57 for interconnecting the above mentioned components. In the data memory 53A, QoS table 58, a U-AGW address table 59, and other data storage areas are formed.

Figure 9:
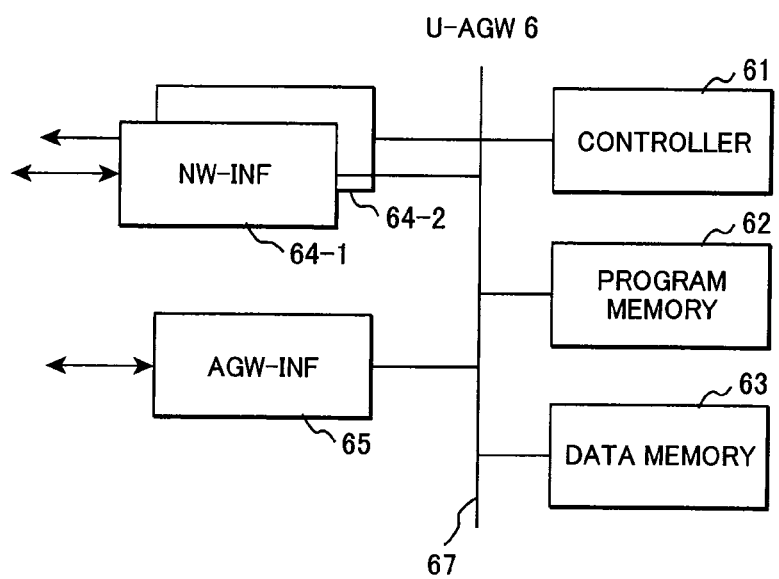
FIG. 9 is a block structural diagram showing an embodiment of a U-AGW 6.

FIG. 9 is a block structural diagram sowing an embodiment of the U-AGW 6.

The U-AGW 6 comprises a controller (processor) 61, a program memory 62 for storing various control programs to be executed by the controller 61, a data memory 63, a network interface (NW-INF) 64-1 for connecting to the core network 1, a network interface (NW-INF) 64-2 for connecting to the access network 8, an AGW interface (AGW-INF) 65 for connecting to the AGW internal bus 40, and an internal bus 67 for interconnecting the above mentioned components.

The network interface (NW-INF) 64-2 for connecting to the access network 8 may be connected to the access network 8 via a packet switch associated with the AGW 4, together with the NW-INFs 64-2 of the other U-AGWs in the same AGW 4.

FIGS. 10A and 10B illustrate embodiments of a QoS information table 58 formed in the memory 53 of the C-AGW 5.

The QoS information table 58 comprises a plurality of table entries. Each table entry indicates the correspondence of a mobile station identifier (ATID) 581 to the user QoS profile 582.

The user QoS profile 582 represents, for example, as can be seen in FIG. 10A, a priority 582A of communication service or resource allocation for a mobile station identified by the ATID 581 and a maximum bandwidth (BW) 582 available for the mobile station.

As can be seen in FIG. 10B, the user QoS profile 582 may include other information 582C, such as, e.g., a communication service class (Allowed Service Class), in addition to the priority 582A and the maximum bandwidth (BW) 582B. As the communication service class, information for specifying a communication service class ensured to the AT user by a contract beforehand, for example, a service class of data communication, voice communication, or video communication is stored.

FIG. 11 illustrates an embodiment of the U-AGW address table 59 formed in the memory 53 of the C-AGW 5.

The U-AGW address table 59 comprises a plurality of table entries, each of which indicates, in association with a mobile station identifier (ATID) 591, a U-AGW address 592, a base station (BS) address 593, and a binding type 594.

The U-AGW address 592 and the BS address 593 represent IP addresses of the U-AGW and the base station to be the endpoints of a tunnel for forwarding user packets, respectively. The binding type 594 stores "Primary" when the tunnel between a base station designated by the BS address 593 and a U-AGW designated by the U-AGW address 592 is the first one for the mobile station identified by the ATID 591 and "RL Only" when the tunnel is the second or subsequent one coexisting with the first tunnel. In the case where a management apparatus for supervising the session status of each mobile station is located as an entity governing the BS, for example, each base station may decide whether the binding type should be "primary" or "RL Only" in accordance with control information supplied from the management apparatus.

In FIG. 11, for example, a table entry EN1 indicates that the tunnel (tunnel 9A in FIG. 2) established between the base station 10A having the IP address "IP10A" and the U-AGW 6-1 having the IP address "IP6-1" is the first tunnel for the AT 20A. Likewise, a table entry EN" indicates that the tunnel (tunnel 9B in FIG. 2) established between the base station 10B having the IP address "IP10B" and the U-AGW 6-2 having the IP address "IP6-2" is the first tunnel for the AT 20B.

FIGS. 12A and 12B illustrate the states of the U-AGW address table 59 in the case where the AT 20A being in communication through the tunnel 9A has moved from the coverage area of base station 10A into the coverage area of another base station 10B having an IP address "IP10B" and a new tunnel (tunnel 9A' in FIG. 2) was established between the base station 10B and the U-AGW 6-1.

FIG. 12A illustrates the state of U-AGW address table 59 in the case where the AT 20A is allowed to coexist a plurality of tunnels. Here, a table entry EN11 indicates that the tunnel established between the base station 10B having the IP address "IP10B" and the U-AGW 6-1 having an IP address "IP6-1" is the second or subsequent one ("RL Only") for the AT 20A.

FIG. 12B illustrates the state of U-AGW address table 59 in the case where the AT 20A has been handed over from the base station 10A to the base station 10B and the new tunnel 9A' was established instead of the existing tunnel 9A.

In this case, when the AT 20A has been handed over from the base station 10A to the base station 10B, the BS address 593 in an existing table entry EN1 is changed from the IP address "IP10A" of base station 10A to the IP address "IP10B" of base station 10B and the binding type 594 of the table entry EN1 is kept in the status of "Primary".

Figure 4:
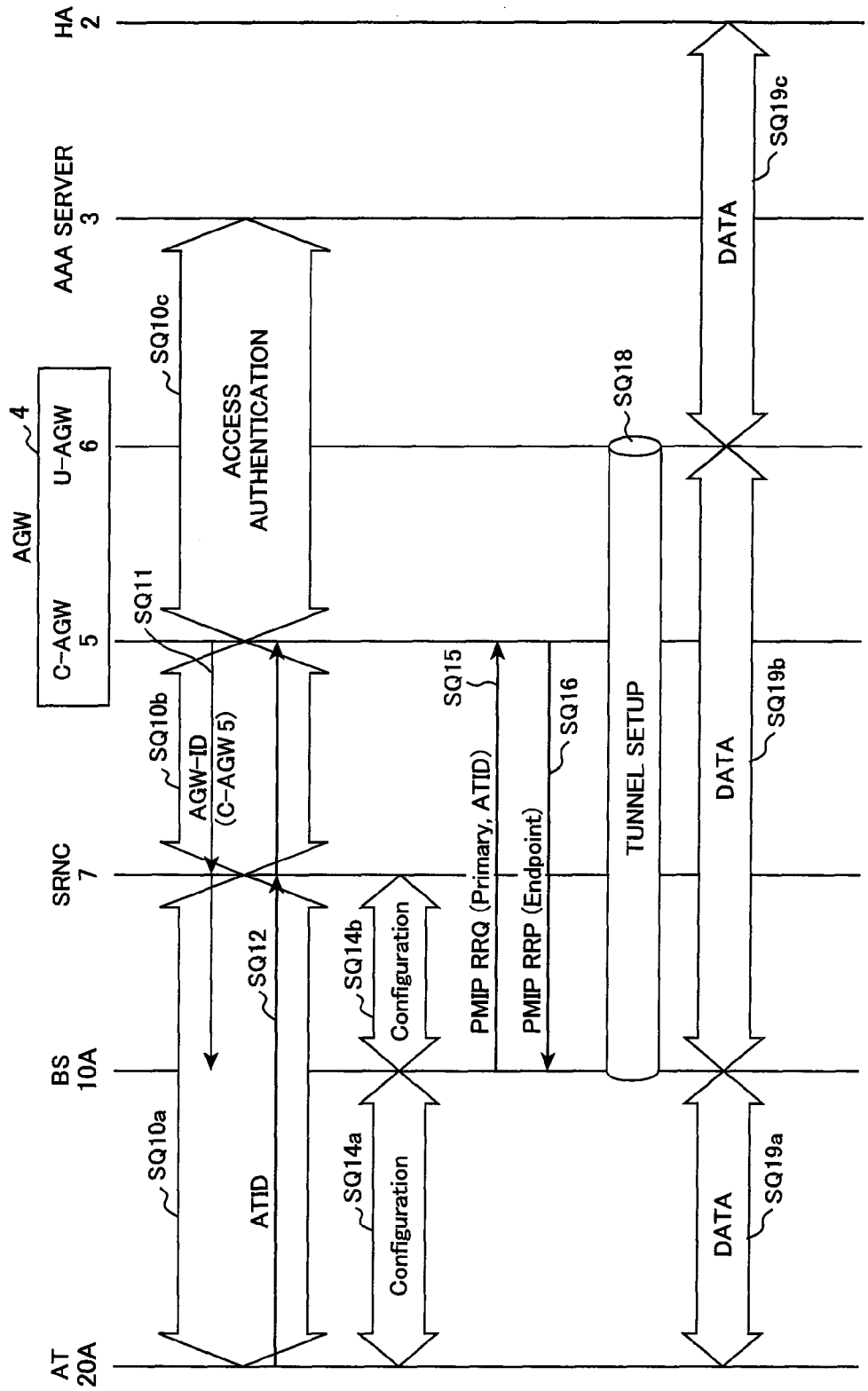
FIG. 4 is a diagram to explain a signaling sequence for establishing a tunnel for forwarding user data in the wireless access network shown in FIG. 3.
Figure 13:
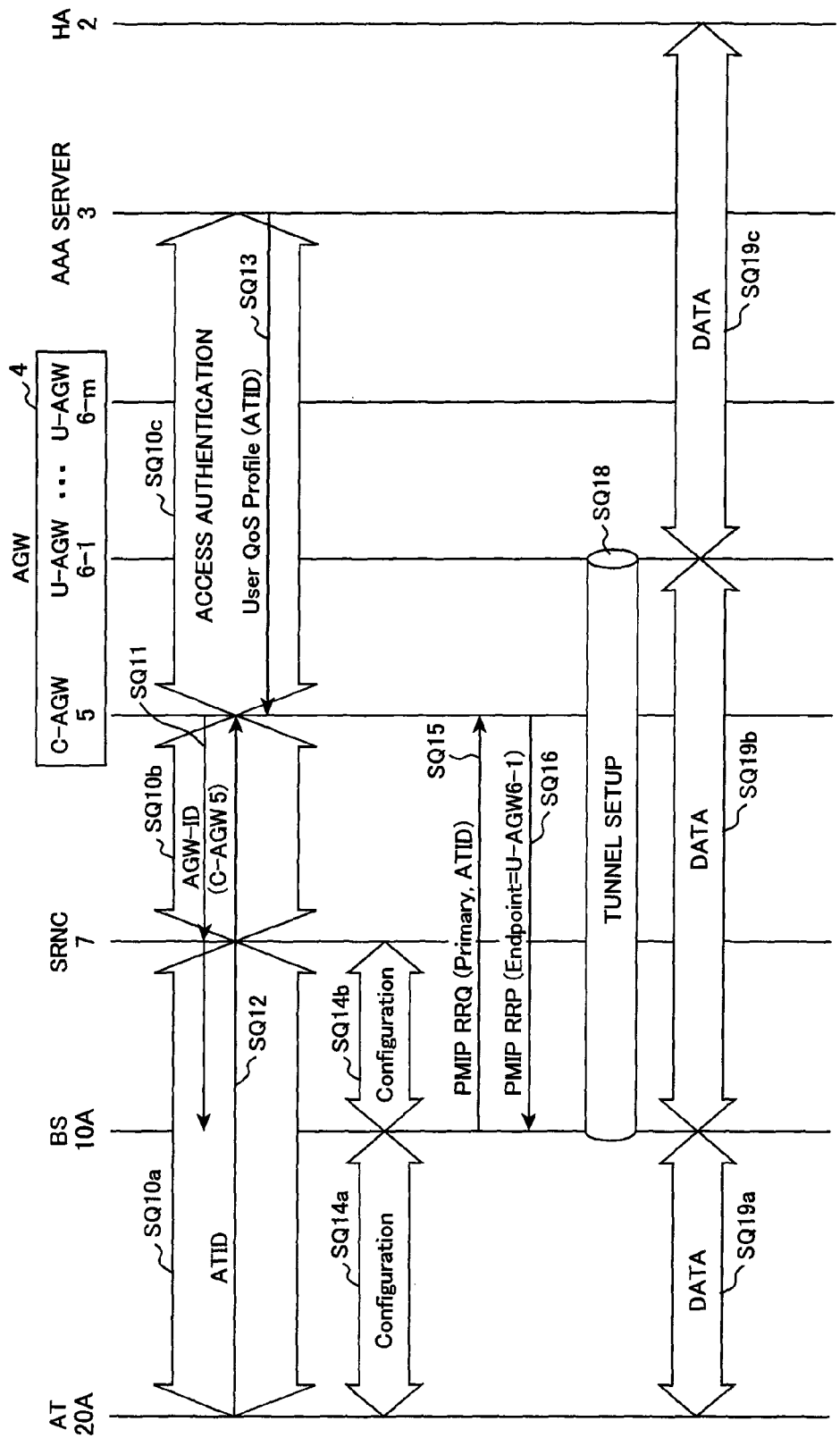
FIG. 13 is a signaling sequence diagram to explain the function of C-AGW 5 of the present invention.

FIG. 13 illustrates the first embodiment of a signaling sequence for establishing a tunnel for forwarding user data between the base station 10A and one of U-AGWS 6-1 to 6-*m* in the mobile communication system of the present invention. Here, a signaling sequence will be explained, similarly to FIG. 4, about the case where the AT 20A is connected to the core network in the wireless access network shown in FIG. 2, but the explanation for the same part as the conventional signaling sequence having been described will be simplified by applying the same reference symbols as used in FIG. 4.

In the access authentication procedures SQ10*a* to SQ10*c* of the mobile station (AT) 20A, when access authentication and user authentication of the AT 20A was completed, the AAA server 3 notifies the C-AGW 5 of the user QoS profile indicating a communication service quality that is allowed for the user of the AT 20A (SQ13).

Figure 14:
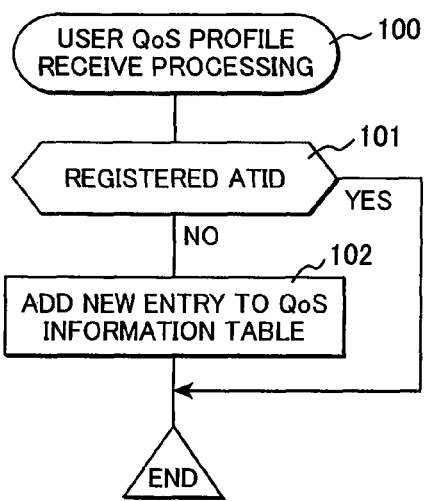
FIG. 14 is a flowchart illustrating an embodiment of user QoS profile receive processing routine 100 to be executed by the controller 51 of the C-AGW 5.

Upon receiving the user QoS profile from the AAA server 3, the controller 51 of the C-AGW 5 executes a user QoS profile receive processing routine 100 shown in FIG. 14.

In the user QoS profile receive processing routine 100, the controller 51 checks whether the AT identifier (ATID) notified from the AT 20A at step SQ12 in FIG. 13 has already been registered as ATID 561 in the QoS information table 58 (step 101). If the ATID of the AT 20A has already been registered in the QoS information table 58, the controller 51 terminates the routine 100. If the ATID of the AT 20A is not yet registered in the QoS information table 58, the controller 51 adds a new table entry indicating the correspondence of the ATID to the user QoS profile notified from the AAA server 3 to the QoS information table 58 (102) and terminates the routine 100.

When the access authentication of the AT user was completed, the BS 10A performs configurations (SQ14*a*, SQ14*b*) to establish a wireless connection with the AT 20A and after that, the BS 10A transmits to the C-AGW 5 a tunnel setup request (PMIP RRQ) message requesting a tunnel for forwarding user data. The request message includes the identifier (ATID) of the AT 20A (SQ15).

Upon receiving the tunnel setup request (PMIP RRQ) message, the controller 51 of the C-AGW 5 selects a U-AGW to be assigned to the AT 20A (U-AGW 6-1 in this example) out of the U-AGWs 6-1 to 6-*m*, and returns to the BS 10A a reply message (PMIP RRP) including the IP address of the U-AGW 6-1 as the endpoint of the tunnel (SQ18). At this time, the controller 51 of the C-AGW 5 updates the U-AGW address table in the memory 53 by adding a new table entry that indicates, in association with the ATID specified in the PMIP RRQ message, the IP address of selected U-AGW, the IP address of BS having transmitted the PMIP RRQ message, and the binding type indicated in the PMIP RRQ message.

Figure 15:
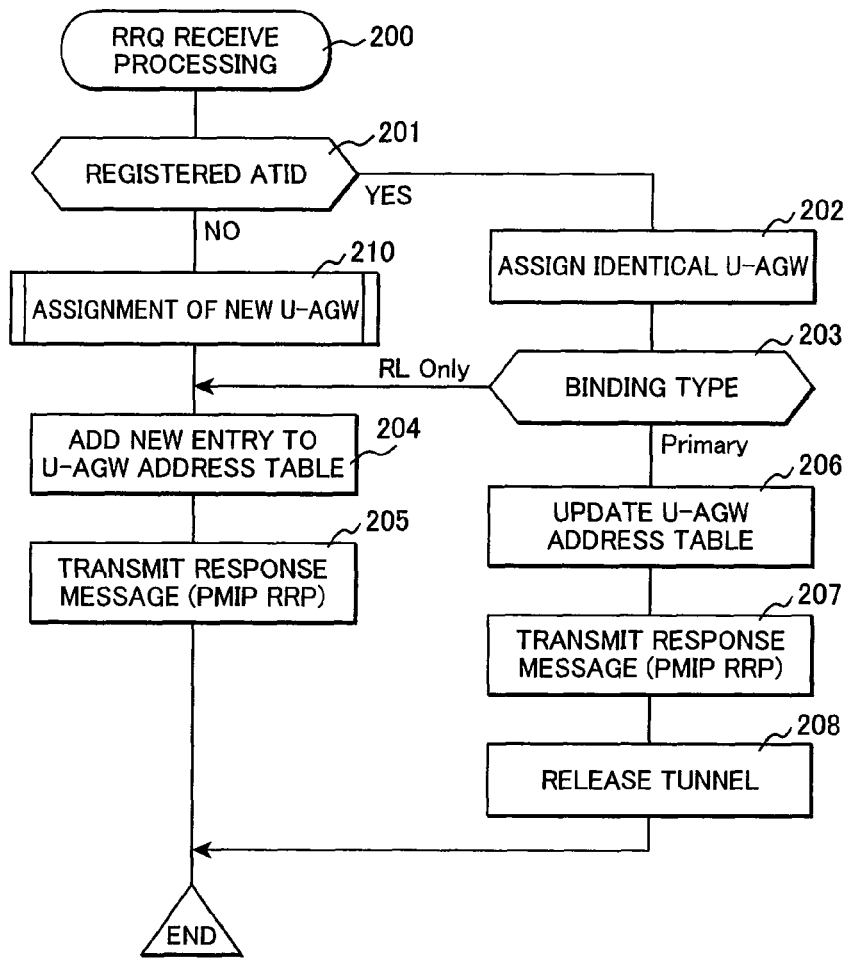
FIG. 15 is a flowchart illustrating an embodiment of RRQ receive processing routine 200 to be executed by the controller 51 of the C-AGW 5.

FIG. 15 illustrates an RRQ receive processing routine 200 to be executed by the controller 51 in response to receiving the tunnel setup request (PMIP RRQ) message.

In the RRQ receive processing routine 200, the controller 51 checks whether the ATID specified in the received PMIP RRQ message has already been registered as ATID 591 in one of table entries of the U-AGW address table 59 (step 201).

In the exemplified sequence, the ATID specified in the PMIP RRQ message is not yet registered in the U-AGW address table 59. In this case, the controller 51 assigns a new U-AGW (U-AGW 6-1 in this example) to the AT 20A (210) and adds to the U-AGW address table 59 a new table entry that indicates, in association with the ATID, the IP address of the U-AGW 6-1, the IP address of BS (BS 10A) having transmitted the PMIP RRQ message, and the binding type indicated in the PMIP RRQ message (204). After that, the controller 51 returns a reply message (PMIP RRP) including the IP address ("IP6-1") of the U-AGW 6-1 as the endpoint to the BS 10A having transmitted the PMIP RRQ message (205, SQ16 in FIG. 13) and terminates the routine 200.

If the ATID specified in the PMIP RRQ message has already been registered as ATID 591 in one of table entries of the U-AGW address table 59, the controller 51 assigns a U-AGW specified by the U-AGW address 592 of the table entry to the AT 20A (202) and determines the biding type specified by the PMIP RRQ message (203).

When the biding type is "RL Only", that is, in the case where the mobile communication system shown in FIG. 1 has a system framework that allows establishing a plurality of tunnels for the same AT as described with reference to FIG. 12A, the controller 51 adds to the U-AGW address table 59 a new table entry that indicates, in association with the ATID, the IP address of the U-AGW 6-1, the IP address of BS (BS 10A) having transmitted the PMIP RRQ message, and the binding type indicated in the PMIP RRQ message at step 204. Then, the controller 51 returns a reply message (PMIP RRP) to the BS (BS 10A) having transmitted the PMIP RRQ message (205) and terminates the routine 200.

If the binding type is "Primary", that is, in the case where the mobile communication system has a system framework in which AT is handed over between base stations as described with reference with FIG. 12B, the controller 51 rewrites the BS address 593 of the relevant table entry registered in the U-AGW address table 59 (206). After that, the controller 51 returns a reply message (PMIP RRP) including the IP address of the U-AGW assigned in step 202 as the endpoint to the BS (BS 10A) having transmitted the PMIP RRQ message (207), releases the existing tunnel used before the handover (208), and terminates the routine 200.

Figures 16, 17:
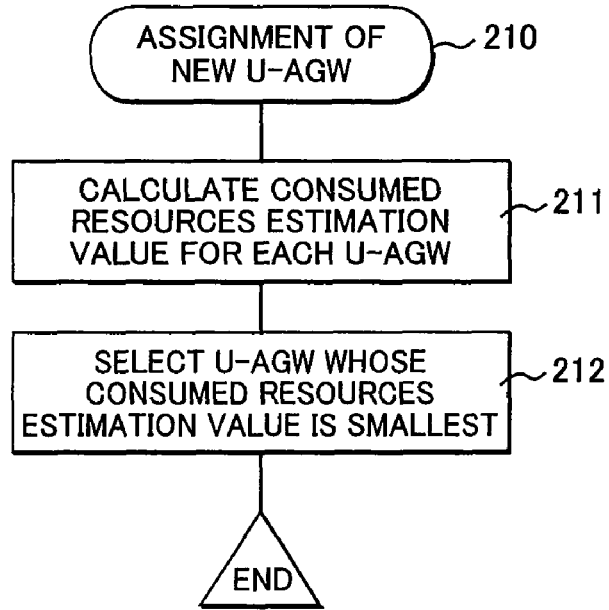
FIG. 16 shows a detailed flowchart of new U-AGW assignment (210) in the RRP receive processing routine 200.
FIG. 17 illustrates an embodiment of a U-AGW status table 300 formed in the memory 53 of the C-AGW 5.

FIG. 16 shows a flowchart describing details of assignment of a new U-AGW (210) in the RRP receive processing routine 200.

In order to assign a new U-AGW, the controller 51 calculates an estimation value of consumed communication resources for each U-AGW in the AGW 4 (211), selects one of U-AGWs whose consumed communication resources is the smallest (212), and assigns the U-AGW to the AT.

The consumed communication resources for each U-AGW can be estimated, for example, by preparing in the memory 53 a U-AGW status table 300 to indicate the amount of consumed resources 302 for each U-AGW in association with the IP address 301 of the U-AGW, as shown in FIG. 17, and by accumulating the amount of communication resources for each U-AGW obtained from the U-AGW address table 59 and the QoS information table 58 as the consumed resources 302.

In the case where a total amount of maximum BWs ensured to each AT by the U-AGW is adopted as the amount of consumed resources 302, the controller 51 may read out the values of ATID 591 and U-AGW address 592 from the U-AGW address table 59, retrieve the value of maximum BW 582B corresponding to the ATID 591 from the QoS information table 58, and accumulate the retrieved maximum BW value in the U-AGW status table 300 as the amount of consumed resources 302 corresponding to the U-AGW address 592. In this case, if two or more table entries are registered for the same ATID 591 in the U-AGW address table 59, like the entries EN1 and EN11 exemplified in FIG. 11, it is preferable to perform the accumulation of maximum BW 582B by using only the first found table entry and exclude the maximum BW value of the remaining table entry with the same ATID from the accumulation.

Figure 18:
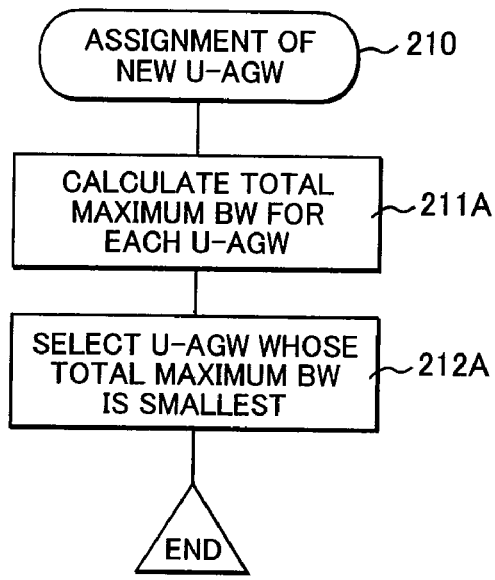
FIG. 18 is a flowchart illustrating one embodiment of the new U-AGW assignment (210)

FIG. 18 shows a flowchart illustrating an embodiment of assignment of a new U-AGW (210), wherein a total amount of maximum BWs ensured to each AT by the U-AGW is adopted as the amount of consumed communication resources.

In this embodiment, the controller 51 calculates the total amount of maximum BWs 582B already ensured to ATs for each U-AGW (IP address) by using the above-mentioned U-AGW status table 300 (211A), selects one of U-AGWs whose total amount of maximum BWs (the amount of consumed resources 302) is the smallest (212A), and assigns the selected U-AGW to the AT. According to the present embodiment, it is possible to prevent a remarkable delay in forwarding data packets from occurring in a particular U-AGW because the loads of the plurality of U-AGWs 6-1 to 6-m are averaged.

Figure 19:
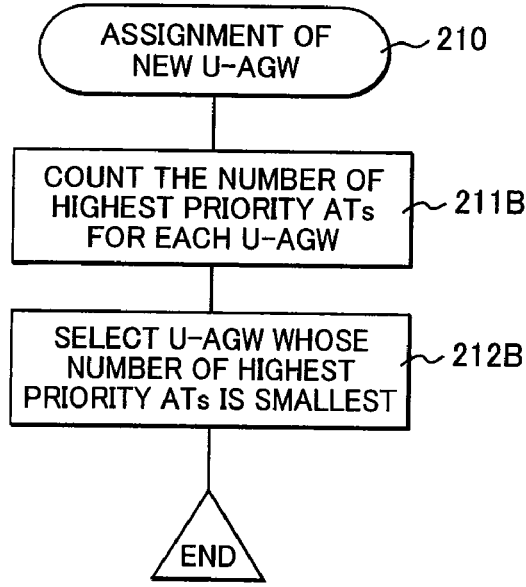
FIG. 19 is a flowchart illustrating another embodiment of the new U-AGW assignment (210)

FIG. 19 shows a flowchart illustrating another embodiment of assignment of a new U-AGW (210), wherein the number of tunnels (the number of ATs) having the highest communication service priority for each U-AGW is adopted as consumed communication resources.

In this embodiment, the controller 51 counts the number of ATs having the highest priority 582A for each U-AGW (IP address) by using the above-mentioned U-AGW status table 300, (211B), selects one of U-AGWs whose number of ATs having the highest priority (the amount of consumed resources 302) is the smallest (212B), and assigns the selected U-AGW to the AT. According to the present embodiment, U-AGW assignment can be performed so as to prevent ATs (users) having been assured high priority services from concentrating at a particular U-AGW.

By selecting a U-AGW based on the QoS information such as maximum bandwidth and service priority as described above, it becomes possible to prevent tunnels for high priority data packets or tunnels for ATs requiring a high transmission rate or a wide bandwidth from concentrating at a particular U-AGW.

Figure 20:
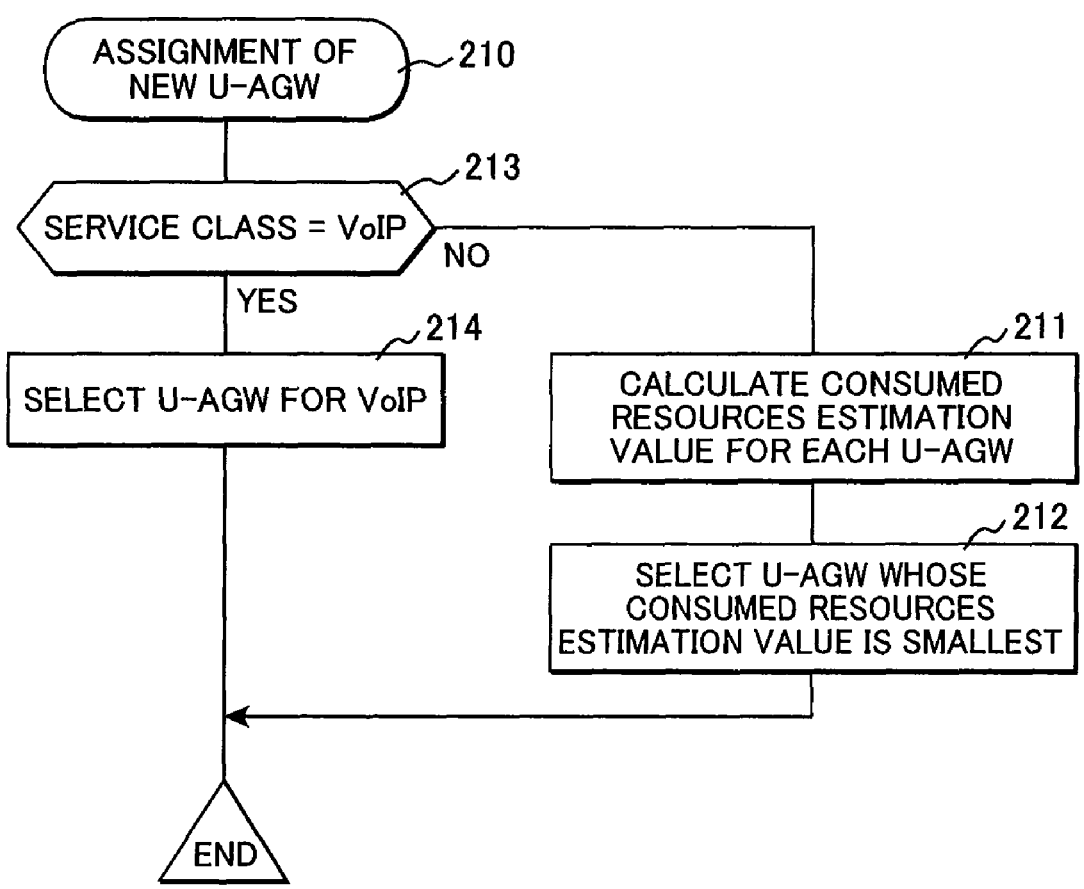
FIG. 20 is a flowchart illustrating a further another embodiment of the new U-AGW assignment (210)

FIG. 20 shows a further another embodiment of assignment of a new U-AGW (210).

In this embodiment, one of U-AGWs is selected based on the allowed service class 582C stored in association with ATID 581 in the QoS information table 58 as shown in FIG. 10B. To simplify explanation, it is assumed here that the allowed service class 582C can include either of two service classes "Data" and "VoIP" and the AGW 4 is configured such that the U-AGW 6-1 is optimized to forward VoIP packets and the other U-AGWs 6-2 to 6-m are optimized to forward data packets.

By using the ATID specified in the RRQ message received from the BS 10A as a search key, the controller 51 of the C-AGW 5 searches the QoS information table 58 for a table entry corresponding to the ATID and checks whether the allowed service class 582C of the searched table entry is "VoIP" (213). If the allowed service class 582C is "VoIP", the controller 51 selects the U-AGW 6-1 and assigns the U-AGW 6-1 to the AT 20A.

If the allowed service class 582C is not "VoIP", the controller 51 selects one of U-AGWs whose estimation value of consumed resources is the smallest out of the U-AGWs 6-2 to 6-m, according to the procedures (212, 222) having been described with reference to FIG. 16, and assigns the selected U-AGW to the AT 20A. Instead of steps 211 and 212 in FIG. 20, the procedures described in FIG. 18 and FIG. 19 may be applied.

In the case where the AGW 4 is configured such that two or more U-AGWs are optimized to forward VoIP packets, the controller 51 can select one of U-AGWs whose estimation value of consumed resources is the smallest from among the two or more U-AGWs, according to the procedure described in FIG. 16, in step 214 in FIG. 20.

Here, U-AGWs dedicated to VoIP packets and U-AGWs used for the other data packets are implemented by optimizing hardware or software. To optimize the hardware, for example, increasing the capacity of the data memory 63, speeding up the controller (processor) 61, and/or speeding up the network interface 64 may be applied. Optimizing the software may be realized by, for example, specializing the software stored in the program memory 62 and/or adding functions adapted for service types.

Although the description was provided here for the case where the service class is "Data" or "VoIP", the service class may be classified into three or more classes. Classifying the communication services into "Data" and "VoIP" is only exemplary; communication services may be classified from a different perspective.

In the above embodiment, a U-AGW to be assigned to each AT is selected based on the allowed service class 582C stored as a part of user QoS profile 582 in the QoS information table 58. Alternatively, the controller 51 may select the U-AGW by referring to information other than the service class in step 213 of the new U-AGW assignment processing 210. For example, a high transmission rate U-AGW 6-j dedicated to the forwarding of broadband data packets may be prepared in the group of U-AGWs 6-1 to 6-m so that the controller 51 can assign the U-AGW 6-j to an AT whose maximum BW exceeds a predetermined value. Two or more U-AGWs dedicated to the forwarding of broadband data packets may be prepared in the AGW 4 so that the loads of forwarding the broadband data packets are distributed to the plural U-AGWs.

In order to select a suitable one of U-AGWs, QoS information in a link layer between the AT 20 and the BS 10 (radio area) may be used. Since a correlation exists between the QoS of radio link layer and the QoS of IP layer which is upper than the former, a user requiring a high QoS in the radio link layer needs a high QoS in the IP layer as well. Consequently, the U-AGW to be assigned to each AT may be selected by adopting QoS information in the radio link layer as an index of the amount of consumed communication resources, thereby to distribute the loads of packet forwarding to the U-AGWs.

Returning to FIG. 13, when the PMIP RRP message is received from the C-AGW 5, the BS 10A establishes a tunnel toward the U-AGW 6-1 having the IP address ("IP6-1") specified by "Endpoint" in the received message (SQ18). Then, the AT 20A becomes in the state capable of communicating user data with the correspondent node via the BS 10A and the U-AGW 7 (SQ19a, SQ19b, SQ19c). As described above, according to the present embodiment, it is possible to establish tunnels while distributing the loads of packet forwarding to a plurality of U-AGWs.

Figure 21:
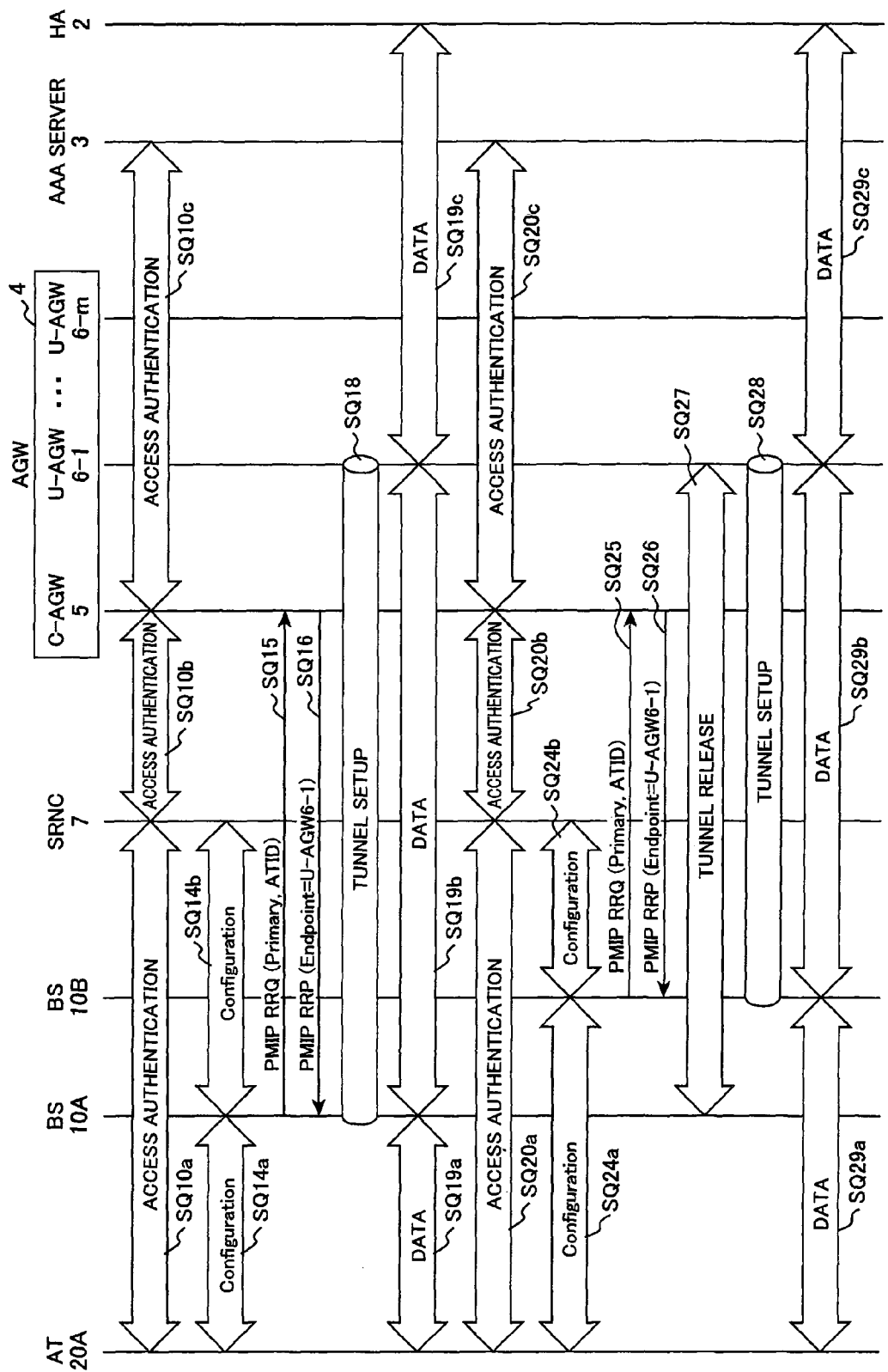
FIG. 21 is a signaling sequence diagram for explaining the function of the C-AGW 5 of the present invention.

Next, a description will be made by referring to FIG. 21 about a signaling sequence of an AT handover to be performed when the AT 20A has moved from the coverage area of BS 10A into the coverage area of BS 10B shown in FIG. 2. In FIG. 21, as the sequences SQ10a to SQ19c are the same as those in FIG. 13, their description will be omitted.

Assume here that the AT 20A being in the state of communication using the tunnel established between the BS 10A and the U-AGW 6-1 has moved into the coverage area (service area) of the BS 10B. The AT 20A monitors the status of radio channel for each base station periodically, for example, by measuring the quality of pilot signal received from the BS (10A, 10B) or based on control information communicated with each base station.

When the status of the radio channel of the new BS 10B has become better than that of the BS 10A, the AT 20A starts a handover from the BS 10A to the BS 10B. The handover of AT 20A, however, may be initiated by the base station 10A or 10B.

Upon receiving a handover request from the AT 20A, the BS 10B performs the access authentication procedure of AT 20A, with the AAA server 3 via the SRNC 7 and the C-AGW 5 (SQ20a, SQ20b, SQ20c). In this case, similarly to the first access authentication procedure (SQ10a, SQ10b, SQ10c) detailed in FIG. 13, the IP address of C-AGW 5 to which the BS 10B is linked is notified from the C-AGW 5 to the BS 10B, the identifier (ATID) of AT 20A is notified from the AT 20A to the C-AGW 5, and the user QoS profile corresponding to the ATID is notified from the AAA server 3 to the C-AGW 5.

Upon receiving the user QoS profile from the AAA server 3, the controller 51 of the C-AGW 5 executes the user QoS profile receive processing routine 100 illustrated in FIG. 14. This time, as the table entry corresponding to the ATID of the AT 20A has already been registered in the QoS information table 58, update of QoS information table 58 is not carried out.

When the access authentication procedure (SQ20a, SQ20b, SQ20c) was completed, the BS 10B performs configurations (SQ24a, SQ24b) for establishing a wireless connection between the AT 20A and the BS, and transmits a tunnel setup request (PMIP RRQ) message to the C-AGW 5. The PMIP RRQ message transmitted from the BS 10B to the C-AGW 5 includes the identifier of AT 20A as its ATID and "Primary" as its binding type.

Upon receiving the PMIP RRQ message from the BS 10B, the controller 51 of the C-AGW 5 selects a U-AGW to be assigned to the AT 20A by executing the RRQ receive processing routine 200 illustrated in FIG. 15. This time, as the table entry EN1 corresponding to the identifier (ATID) of the AT 20A has already been registered in the U-AGW address table 59, the controller 51 selects the U-AGW 6-1 designated by the U-AGW address 592 in the table entry EN1 and returns to the BS 10B a reply message (PMIP RRP) in which "Endpoint" specifies the IP address "IP6-1" of the U-AGW 6-1 (SQ26). At this time, the controller 51 updates the table entry EN1 of the U-AGW address table 59 as shown in FIG. 12B, in step 206 of the RRQ receive processing routine 200.

After transmitting the PMIP RRP message, the controller 51 releases the existing tunnel 9A between the BS 10A and the U-AGW 6-1, for example, by transmitting a tunnel release message to the BS 10A (SQ27). The tunnel may be released by instructing the U-AGW 6-1 to release the tunnel from the controller 51 through the AGW internal bus and by transmitting a tunnel release message from the U-AGW 6-1 to the BS 10A. The existing tunnel 9A is released when a predetermined time passed after the PMIP RRP message was transmitted, for example, by timer control.

Upon receiving the reply message (PMIP RRP) from the C-AGW 5, the BS 10B establishes a new tunnel toward the U-AGW 6-1 specified by the "Endpoint" (SQ28). Then, the AT 20A becomes in the state capable of communicating user data with the correspondent node via the BS 10B and the U-AGW 6-1 (SQ29a, SQ29b, SQ29c).

According to the present invention, because the C-AGW 5 can assign, as the endpoint of new tunnel established after handover of the AT 20A, the same U-AGW 6-1 that was terminating the existing tunnel for the AT 20A before the handover, it is able to realize inter-BS handover requiring no route change between the AGW 4 and the core network.

Figure 22:
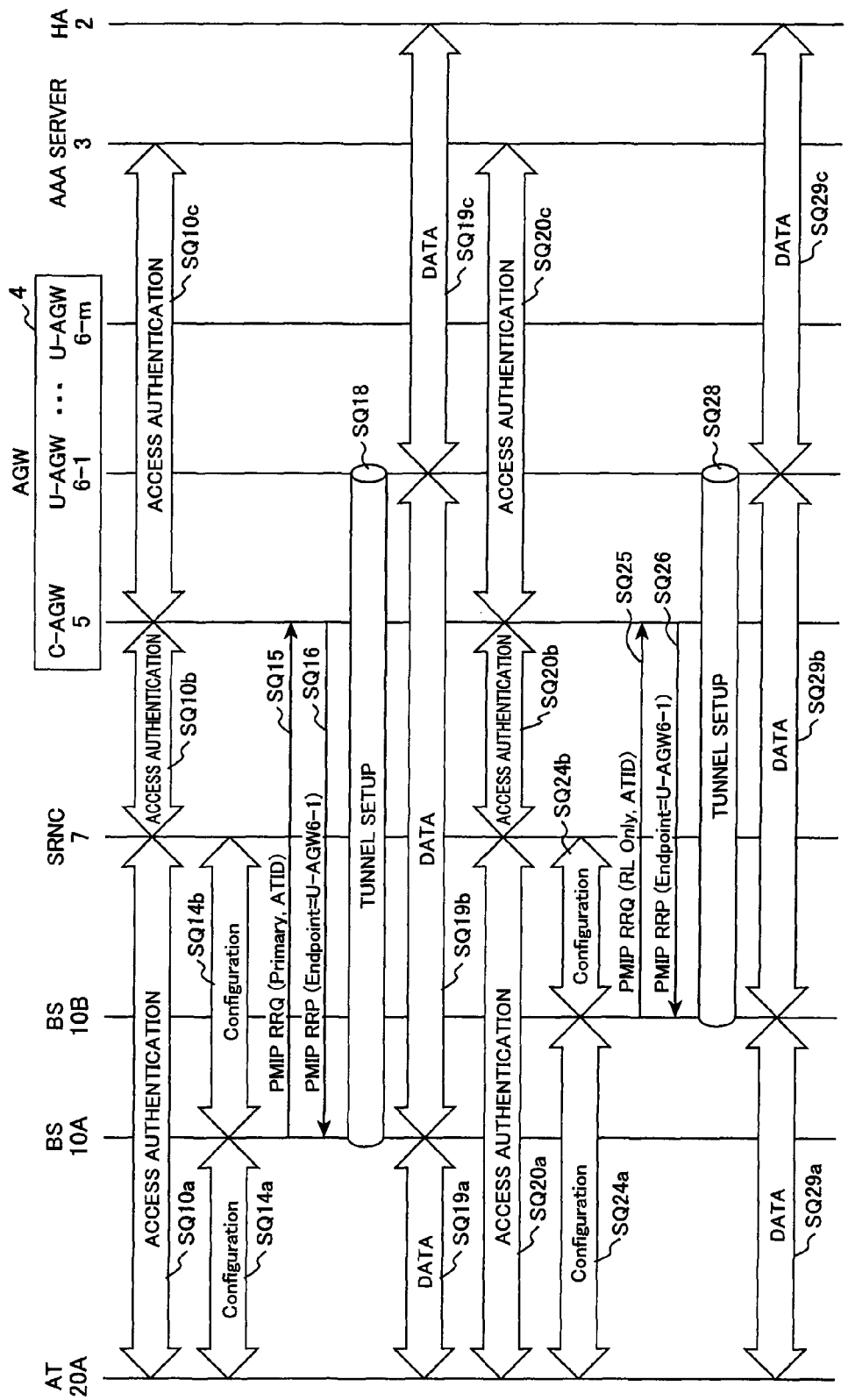
FIG. 22 is a signaling sequence diagram for explaining another function of the C-AGW 5 of the present invention.

Next, a description will be made about a signaling sequence for setting up a plurality of tunnels in parallel for the same AT 20A, by referring to FIG. 22, but description on sequence parts common to FIG. 21 will be omitted or simplified.

Assume here that the AT 20A being in the state of communication using the tunnel established between the BS 10A and the U-AGW 6-1 has moved into the coverage area of the BS 10B. In the present embodiment, when the AT 20A has entered the coverage area of the BS 10B, a new tunnel 9A' via the BS 10B is established in parallel to the existing tunnel 9A via the BS 10A.

When the AT 20A was detected, the BS 10B performs the access authentication procedure of the AT 20A with the AAA server 3 via the SRNC 7 and the C-AGW 5 (SQ20a, SQ20b, SQ20c). At this time, the IP address of the C-AGW 5 to which the BS 10B is linked is notified from the C-AGW 5 to the BS 10B, the identifier (ATID) of the AT 20A is notified from the AT 20A to the C-AGW 5, and user QoS profile corresponding to the ATID is notified from the AAA server 3 to the C-AGW 5.

Upon receiving the user QoS profile from the AAA server 3, the controller 51 of the C-AGW 5 executes the user QoS profile receive processing routine 100 shown in FIG. 14. This time, as a table entry corresponding to the ATID of the AT 20A has already been registered in the QoS information table 58, update of the QoS information table 58 is not performed.

Upon completing the access authentication procedure (SQ20a, SQ20b, SQ20c), the BS 10B performs configurations (SQ24a, SQ24b) to establish a wireless connection with the AT 20A and transmits a tunnel setup request (PMIP RRQ) message to the C-AGW 5 (SQ25').

It is assumed here that a tunnel for upward transmission only (reverse link: "RL Only") can be established as a new tunnel 9A' in the state where the first tunnel ("primary") for bidirectional (reverse link/forward link) transmission has been established. Such a tunnel setup function is provided in the above-mentioned UMB (Ultra Mobile Broadband) wireless system.

The PMIP RRQ message transmitted from the BS 10B to the C-AGW 5 includes the identifier of the AT 20A as ATID and "RL Only" as the binding type, which indicates that the tunnel to be established is the second or subsequent one for the AT 20A.

Upon receiving the PMIP RRQ message from the BS 10B, the controller 51 of the C-AGW 5 executes the RRQ receive processing routine 200 shown in FIG. 15 and selects one of U-AGWs to be assigned to the AT 20A. This time, the table entry EN1 including the ATID corresponding to the identifier of the AT 20A has been already registered in the U-AGW address table 59. Thus, the controller 51 selects the U-AGW 6-1 designated by the U-AGW address 592 in the table entry EN1 in step 202 of the RRQ receive processing routine 200, adds a new table entry EN11 to the U-AGW address table 59 as exemplified in FIG. 12A in step 204, and returns to the BS 10B a reply message (PMIP RRP) in which the "Endpoint" designates the IP address "IP6-1" of the U-AGW 6-1 (SQ26).

Upon receiving the reply message (PMIP RRP) from the C-AGW 5, the BS 10B establishes a new tunnel toward the U-AGW 6-1 specified by the "Endpoint" (SQ28). Then, the AT 20A becomes in the state capable of communicating user data with the correspondent node via the BS 10A and the U-AGW 6-1 (SQ29a, SQ29b, SQ29c).

Establishing a tunnel between the BS and the U-AGW 6 needs a certain period of time. Further, if the AT 20A is promptly handed over from BS 10A to BS 10B when the AT 20A has entered into the coverage area of the BS 10B, a reverse handover from the BS 10B to the BS 10A would occur when the AT 20A has returned to the coverage area of the BS 10A. In this case, the load of the C-AGW 5 increases with the frequent inter-BS handovers.

According to the present embodiment, a pair of tunnels are established in parallel between the same AGW 4 and two BSs (BS 10A and BS 10B in FIG. 22) having a high possibility of occurring handover between them. It is possible, therefore, to prevent the load of the C-AGW 5 from increasing due to inter-BS handovers, even if the AT 20A wanders around the boundary between the coverage areas of BS 10A and 10B.

In the present invention, when the second tunnel 9A' is established for the AT 20A via the BS 10B after the first tunnel 9A has been established for the AT 20A via the BS 10A, because the controller 51 of the C-AGW 5 selects one of U-AGWs so that the second tunnel has the same endpoint as that of the first tunnel, the AGW 4 can process the data packets from the AT 20A by the same U-AGW, even if the AT 20A wanders around cell boundary. According to the present invention, therefore, when the base station for relaying upward packets transmitted from the AT 20A was switched from a current BS to a new BS, it is able to process the upward packets by the same U-AGW (U-AGW 6-1 in this example) continuously.

In the case where the first and second tunnels used for the same AT are terminated at different U-AGWs, U-AGW is changed in conjunction with the BS changeover when the AT is handed over. In this case, complicated control is needed within the AGW 4, e.g., for data transfer and signaling between the U-AGWS, particularly, in the forwarding of downward packets from the core network 1 to the AT. There is no need for such special control, however, in the present invention.

What is claimed is:

1. A mobile communication system comprising a plurality of base stations for wirelessly communicating with mobile stations and an access gateway (AGW) connected to a core network, where a plurality of tunnels for forwarding data packets are established between each of the base stations and the AGW,
    the AGW comprising an access gateway unit (C-AGW) for communicating control messages with each of said plurality of base stations via an access network and a plurality of access gateway units (U-AGWs) each of which communicates data packets with said plurality of base stations via the access network,
    said C-AGW comprising:
    a first management table including a plurality of table entries, each storing an address of one of said base stations to be a first endpoint of a tunnel and an address of one of said U-AGWs to be a second endpoint of the tunnel, in association with a mobile station identifier; and
    a controller that returns a reply message to one of said base stations when a tunnel setup request message including a mobile station identifier is received from said one of the base stations, the reply message indicating an address of one of said U-AGWs to be the second endpoint of the tunnel,
    wherein, the controller searches the first management table for an objective table entry corresponding to the mobile station identifier specified in the tunnel setup request message, notifies said one of the base stations of the address of said one of U-AGWs indicated in the objective table entry by the reply message when the objective table entry is found in the first management table, and if the objective table entry is not yet registered in the first management table, notifies said one of the base stations of an address of a particular U-AGW selected out of said plurality of U-AGWs by the reply message,
    wherein said C-AGW further comprises a second management table including a plurality of table entries, each of which stores in association with the identifier of the mobile station, communication quality information indicating communication quality to be ensured to the mobile station, and
    when said objective table entry is not yet registered in said first management table, said controller searches the second management table for communication quality information corresponding to the mobile station identifier specified in said tunnel setup request message and selects a particular U-AGW that satisfies the communication quality information out of the plurality of U-AGWs.

2. The mobile communication system according to claim 1, wherein, if said objective table entry is not yet registered in said first management table, the controller of said C-AGW registers to the first management table a new table entry indicating the address of the base station having transmitted said tunnel setup request message and the address of said particular U-AGW, in association with the mobile station identifier specified in the tunnel setup request message.

3. The mobile communication system according to claim 2, wherein, in the case where said tunnel setup request message was transmitted from a base station to which the mobile station having said mobile station identifier should be handed over, the controller of said C-AGW rewrites the base station address in said objective table entry registered in said first management table to the address of the base station having transmitted the tunnel setup request message.

4. The mobile communication system according to claim 2, wherein, in the case where said tunnel setup request message requests to establish a second tunnel to be coexistent with a first tunnel being used by the mobile station having said mobile station identifier, the controller of said C-AGW registers to said first management table a new table entry indicating the address of the base station having transmitted the tunnel setup request message and the address of said particular U-AGW, in association with the mobile identifier specified in the tunnel setup request message.

5. The mobile communication system according to claim 1, wherein said C-AGW further comprises a U-AGW status table for indicating an amount of consumed communication resources for each of said U-AGWs, and
    when said objective table entry is not yet registered in said first management table, said controller selects one of said U-AGWs having the smallest amount of consumed communication resources from said U-AGW status table and notifies said base station of the address of the U-AGW by said reply message.

6. The mobile communication system according to claim 1, wherein at least one of said plurality of U-AGWs is dedicated to a specific communication service;
    the communication quality information stored in said second management table includes communication service class; and
    when said objective table entry is not yet registered in said first management table, said controller searches the second management table for a table entry corresponding to the mobile station identifier specified in said tunnel setup request message and selects the particular U-AGW dedicated to the specific communication service when the table entry includes the communication service class corresponding to the specific communication service.

7. The mobile communication system according to claim 1,
wherein the communication quality information stored in said second management table includes service priority; and
when said objective table entry is not yet registered in the first management table, said controller counts the number of tunnels having the highest service priority for each of said U-AGWs based on said first management table and said second management table, and selects a U-AGW having the smallest number of tunnels.

8. The mobile communication system according to claim 1,
wherein the communication quality information stored in said second management table includes a bandwidth value; and
when said objective table entry is not yet registered in said first management table, said controller calculates a total amount of bandwidth ensured for tunnels having been established for each of said U-AGWs based on said first management table and said second management table, and selects a U-AGW having the smallest total amount of bandwidth.

9. An access gateway (AGW) to be located between a plurality of base stations for wirelessly communicating with mobile stations and a core network, the access gateway (AGW) comprising:
an access gateway unit (C-AGW) for communicating control messages with each of said plurality of base stations via an access network; and
a plurality of access gateway units (U-AGWs) each of which communicates data packets with said plurality of base stations via the access network,
said C-AGW comprising:
a first management table including a plurality of table entries, each storing an address of one of said base stations to be a first endpoint of a tunnel and an address of one of said U-AGWs to be a second endpoint of the tunnel, in association with a mobile station identifier; and
a controller that returns a reply message to one of said base stations when a tunnel setup request message including a mobile station identifier is received from said one of the base stations, the reply message indicating an address of one of said U-AGWs to be the second endpoint of the tunnel,
wherein, the controller searches the first management table for an objective table entry corresponding to the mobile station identifier specified in the tunnel setup request message, notifies said one of the base stations of the address of one of said U-AGWs indicated in the objective table entry by the reply message when the objective table entry is found in the first management table, and if the objective table entry is not yet registered in the first management table, notifies said one of the base stations of an address of a particular U-AGW selected out of said plurality of U-AGWs by the reply message,
wherein said C-AGW further comprises a second management table including a plurality of table entries, each of which stores in association with the identifier of the mobile station, communication quality information indicating communication quality to be ensured to the mobile station, and
when said objective table entry is not yet registered in said first management table, said controller searches the second management table for communication quality information corresponding to the mobile station identifier specified in said tunnel setup request message and selects a particular U-AGW that satisfies the communication quality information out of the plurality of U-AGWs.

10. The access gateway according to claim 9,
wherein, if said objective table entry is not yet registered in said first management table, the controller of said C-AGW registers to the first management table a new table entry indicating the address of the base station having transmitted said tunnel setup request message and the address of said particular U-AGW, in association with the mobile station identifier specified in the tunnel setup request message.

11. The access gateway according to claim 10,
wherein, in the case where said tunnel setup request message was transmitted from one of said base stations to which the mobile station having said mobile station identifier should be handed over, the controller of said C-AGW rewrites the base station address in said objective table entry registered in said first management table to the address of the base station having transmitted the tunnel setup request message.

12. The access gateway according to claim 10,
wherein, in the case where said tunnel setup request message requests to establish a second tunnel to be coexistent with a first tunnel being used by the mobile station having said mobile station identifier,
the controller of said C-AGW registers to said first management table a new table entry indicating the address of the base station having transmitted the tunnel setup request message and the address of said particular U-AGW, in association with the mobile identifier specified in the tunnel setup request message.

13. The access gateway according to claim 9,
wherein said C-AGW further comprises a U-AGW status table for indicating an amount of consumed communication resources for each of said U-AGWs, and
when said objective table entry is not yet registered in said first management table, said controller selects one of said U-AGWs having the smallest amount of consumed communication resources from said U-AGW status table and notifies said base station of the address of the U-AGW by said reply message.

14. The access gateway according to claim 9,
wherein at least one of said plurality of U-AGWs is dedicated to a specific communication service;
the communication quality information stored in said second management table includes communication service class; and
when said objective table entry is not yet registered in said first management table, said controller searches the second management table for a table entry corresponding to the mobile station identifier specified in said tunnel setup request message and selects the particular U-AGW dedicated to the specific communication service when the table entry includes the communication service class corresponding to the specific communication service.

15. The access gateway according to claim 9,
wherein the communication quality information stored in said second management table includes service priority; and
when said objective table entry is not yet registered in the first management table, said controller counts the number of tunnels having the highest service priority for each of said U-AGWs based on said first management table and said second management table, and selects a U-AGW having the smallest number of tunnels.

16. The access gateway according to claim 9,
wherein the communication quality information stored in said second management table includes a bandwidth value; and
when said objective table entry is not yet registered in said first management table, said controller calculates a total amount of bandwidth ensured for tunnels having been established for each of said U-AGWs based on said first management table and said second management table, and selects a U-AGW having the smallest total amount of bandwidth.

* * * * *